US009267632B1

(12) United States Patent
Delmer

(10) Patent No.: US 9,267,632 B1
(45) Date of Patent: *Feb. 23, 2016

(54) COUPLING FOR PIPE, AND RELATED METHODS

(76) Inventor: Daniel William C. Delmer, Seal Beach, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 13/397,027

(22) Filed: Feb. 15, 2012

Related U.S. Application Data

(63) Continuation of application No. 09/904,975, filed on Jul. 12, 2001, now Pat. No. 8,210,573.

(51) Int. Cl.
*F16L 39/00* (2006.01)
*F16L 9/12* (2006.01)
*F16L 13/14* (2006.01)

(52) U.S. Cl.
CPC . *F16L 39/00* (2013.01); *F16L 9/12* (2013.01); *F16L 13/147* (2013.01); *F16L 2013/145* (2013.01); *Y10T 29/4987* (2013.01)

(58) Field of Classification Search
CPC ............... F16L 1/00; F16L 9/12; F16L 9/133; F16L 13/14; F16L 13/147; F16L 13/166; F16L 2013/145; F16L 33/00; F16L 39/00; F16L 47/20
USPC ................. 285/23, 31, 39, 260, 290.3, 290.4, 285/290.5, 293.1, 381.2, 381.3, 381.4, 285/341.5, 382.4, 382.7, 903, 909, 915, 285/921; 29/890.144, 446, 450, 235, 237, 29/453, 525, 434; 138/121, 122, 173
See application file for complete search history.

(56) References Cited

U.S. PATENT DOCUMENTS

| | | | | |
|---|---|---|---|---|
| 1,676,236 A * | 7/1928 | Armstrong | .................... | 29/235.5 |
| 2,566,454 A * | 9/1951 | Laschke | ......................... | 254/130 |
| 2,914,845 A * | 12/1959 | Crites | ................................ | 29/450 |
| 3,233,313 A * | 2/1966 | Roth | ................................ | 29/235 |
| 3,591,142 A * | 7/1971 | Hatcher | .......................... | 254/258 |
| 3,926,222 A * | 12/1975 | Shroy et al. | .................... | 138/122 |
| 4,702,502 A * | 10/1987 | Shade et al. | .................... | 285/231 |
| 4,913,473 A * | 4/1990 | Bonnema et al. | .............. | 285/423 |
| 4,969,670 A * | 11/1990 | Bonnema et al. | .............. | 285/319 |
| 5,053,097 A * | 10/1991 | Johansson et al. | ............. | 156/158 |
| 5,071,173 A * | 12/1991 | Hegler et al. | .................. | 285/399 |
| 6,044,539 A * | 4/2000 | Guzowski | ........................ | 29/453 |
| 6,049,960 A * | 4/2000 | Pilling et al. | .................... | 29/450 |
| 6,199,592 B1 * | 3/2001 | Siferd et al. | ................... | 138/109 |
| 6,382,681 B1 * | 5/2002 | Berton et al. | ............... | 285/222.1 |
| 7,137,181 B2 * | 11/2006 | Ifort | ................................ | 29/235 |
| 8,210,573 B2 * | 7/2012 | Delmer | ............................ | 285/39 |
| 2003/0090112 A1 * | 5/2003 | Baughman et al. | ............ | 285/903 |
| 2010/0325865 A1 * | 12/2010 | Jeffers | .............................. | 29/450 |

* cited by examiner

*Primary Examiner* — Christopher M Koehler
(74) *Attorney, Agent, or Firm* — J. Mark Holland

(57) ABSTRACT

Apparatus and methods for joining similar pieces of plastic pipe includes using the shape memory of the pipe pieces to slightly deform a "female" end to permit insertion therein of a non-deformed male end. The deformation is sufficient to permit the insertion but not so large as to preclude the substantially complete "recovery" of the female end's shape and size, using the "shape memory" of the pipe material. Embodiments include, without limitation, single-walled (or monowalled) pipe, pipe formed from multiple material layers, corrugated pipe, flat-walled pipe, and others. Preferred tools and apparatus are disclosed for stretching the female end and maintaining the desired stretch during transportation and storage, for sealing the joint (via adhesive/sealant, flange gasket, O-ring, or the like), and for further protecting the resulting joint.

5 Claims, 5 Drawing Sheets

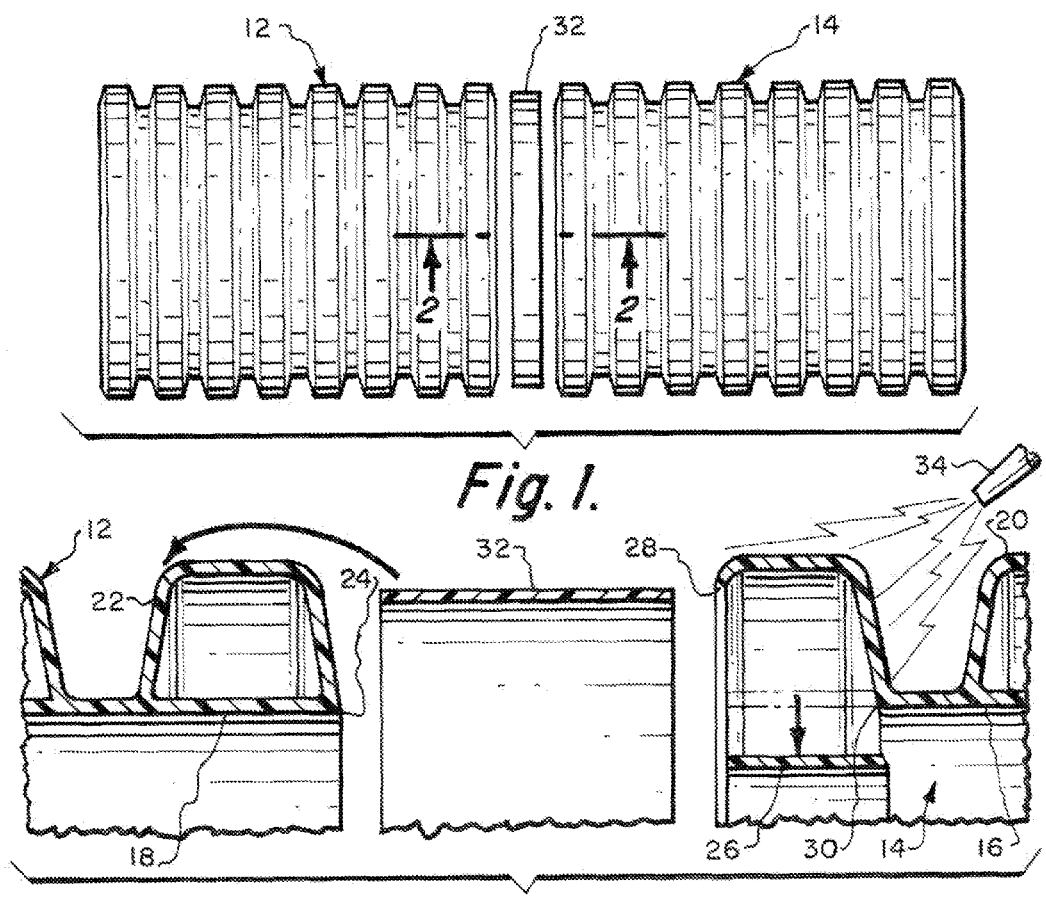
Fig. 1.
Fig. 2.
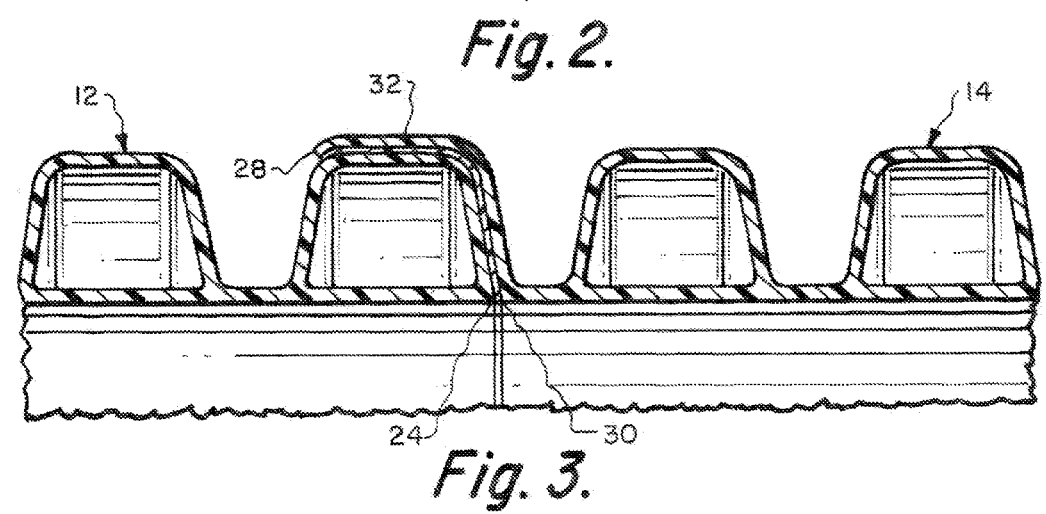
Fig. 3.

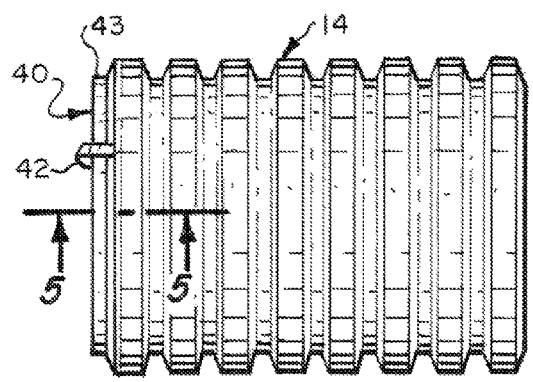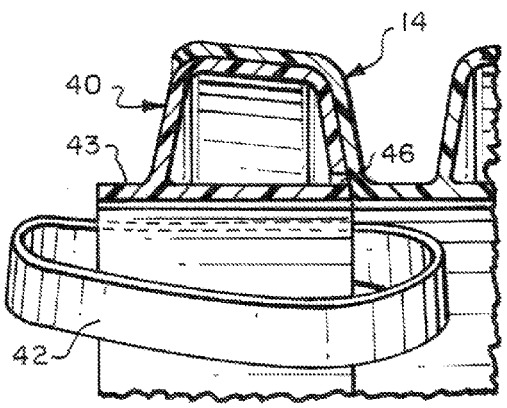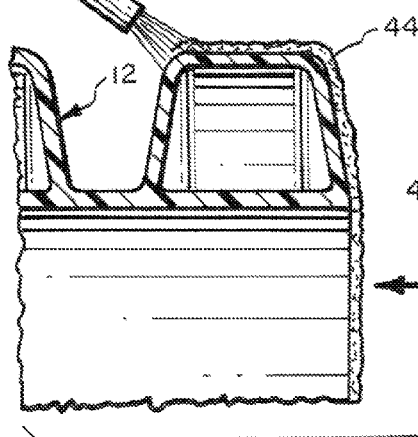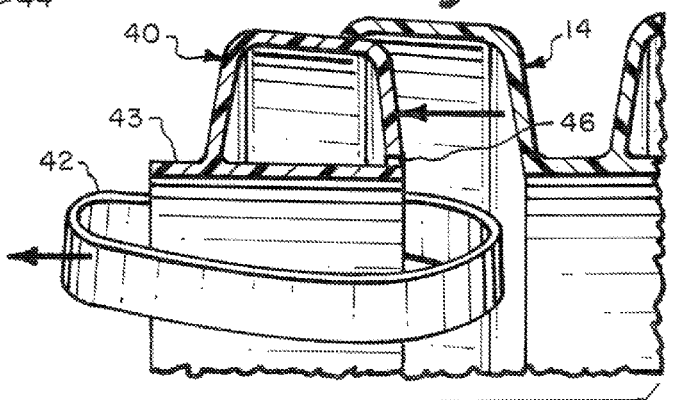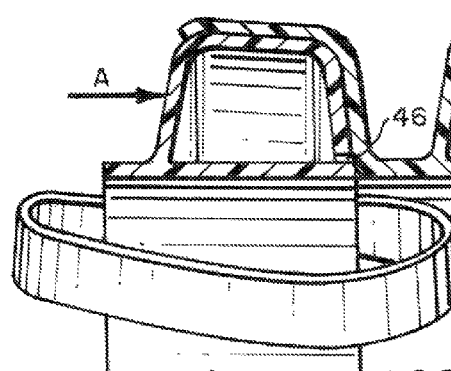
Fig. 4. Fig. 5. Fig. 6. Fig. 7.

COUPLING FOR PIPE, AND RELATED METHODS

CROSS-REFERENCE TO RELATED APPLICATION

This application is a continuation of U.S. patent application Ser. No. 09/904,975 filed Jul. 12, 2001, the contents of which are incorporated herein by reference.

BACKGROUND OF THE INVENTION

This invention relates generally to pipe joints, and more specifically to methods and apparatus for joining similar pieces of plastic pipe to each other where the pipe is made of material that has a "shape memory" that permits slight temporary deformation of the pipe.

Plastic pipe, including corrugated drainpipe, is used extensively in the United States and foreign countries. In many applications, similarly sized and shaped lengths of pipe are fabricated and transported to installation sites, where they are assembled with each other to form a desired extended flowpath for certain fluids. The size and shape of the pipes, as well as the fluids handled and the installation sites, can vary widely. By way of example, corrugated polyethylene drainpipe is commonly 12" diameter and 20' long. Joining the pipe pieces to each other can be an important, time-consuming, and costly process, especially for large-diameter, long pipes where leakage at the joint must be controlled or minimized.

In the United States alone, well over 1 billion pounds of plastic corrugated drainpipe are manufactured and installed per year, and it is gaining market share rapidly in relationship to competing products (such as those constructed of concrete, steel, or clay). The reasons for this market shift toward plastic pipe include many economic and other factors. By way of example, a 12" diameter corrugated drainpipe made of polyethylene weighs only approximately 3.2 pounds/foot, as compared to much heavier concrete or clay pipe (about 79 lbs./ft.) and corrugated steel (10.5 lbs./ft.). The lighter weight provided by plastic materials has corresponding benefits in reducing freight costs, improving the rate of installation, and improving safety when handling and storing the pipe. Again, by way of example, polyethylene corrugated drain pipe has existed for over 20 years and appears to have a secure future. Other plastic pipes have similar current and likely continuing high usage rates.

As indicated above, in certain applications and industries (such as the polyethylene corrugated drainpipe industry), joints between pieces of pipe need to be leak proof and pressure resistant. This pressure resistance to avoid leaking can be critical, for example, in sewage applications, under roadways, and in other applications where watertightness is required. Current joints are unsatisfactory/unreliable for such applications, are expensive, or both.

Integral bell and spigot systems are very common in the drainpipe industry. Some of the most watertight couplings (although they are not sufficiently watertight) currently used to join these large drainpipes are referred to as Bell/Bell couplings. These are generally cylindrical sleeves into which the ends of the pipe are inserted. The couplings are not integrally formed with the pipe pieces, but instead are independently formed and constructed. The Bell/Bell name arises from their typical use of end-to-end or "back to back" "bells" (when viewed in cross-section), each drainpipe end being joined to the other by being inserted into one of the opposing bells. These couplings commonly use "O" ring systems to assist in sealing, with the O-ring positioned around the valley between the first and second rung of the ends of the drainpipe.

A commonly used prior art apparatus and method of "bell/bell couplings" is described in U.S. Pat. No. 5,326,138, which is incorporated herein by reference. Among other things, the approach shown in that patent is costly to manufacture and install, and can be unwieldy to handle.

In addition, tolerance variations commonly found in polyethylene drainpipe are approximately +/−8%. These dimensional variations contribute to the unreliability of current "pressure resisting" couplings and bell and spigot designs. The present methods are so unreliable that a common term used to describe the products is "soil tight" rather than "watertight". "Soil tight" joints usually leak between 0.5 and 4.5 pounds of pressure. In contrast, "watertight" fittings are supposed to meet 10.8 pounds of pressure testing requirements of ASTM D3212. Because those ASTM requirements are for controlled testing conditions and because present coupling technology is so "leaky", if a contract requires post-installation pressure testing of the installed pipe, few if any companies will even bid to use plastic corrugated drainpipe on the project, and instead will only bid to use only clay or some other type of pipe.

In some smaller diameter applications, tubing pieces are joined by compression exerted between the respective pipe walls. Although this approach creates a relatively highly waterproof connection, the two pipe ends typically have to be formed in different diameters. This permits the smaller pipe end to be inserted into the larger pipe end, so that the pieces can be forced together into a compression fit/joint.

Similar use of compression joints for differently sized pipes/openings include irrigation systems wherein a j" polyethylene tube is pushed through a ⅛" hole in the side wall of 1" diameter polyethylene tube. Such joints are held together by shape memory means, and can withstand 25 psi for as long as 30 years (based on certain installations in the Coachella Valley of California, even though the joints are on the earth's surface and therefore have been exposed to the sun and elements throughout most or all of that time. Neither this approach or the one discussed in the previous paragraph provide any way to join the ends of lengths of similarly sized and shaped pipe pieces, but instead require more complicated manufacturing and installation (the pieces are not bi-directional, have to be drilled through the sidewall, etc.).

Other examples of coupling approaches include overlapping joint methods (such as shown in U.S. Pat. No. 4,636,272 to Riggs, and U.S. Pat. No. 4,204,897 to Bartell), and the present inventor's U.S. Pat. No. 6,090,233. Although the latter does join two similarly sized and shaped pieces of very flexible small tubing, the joint and necessary seal between the two pieces is accomplished by simultaneously applying heat and pressure to fuse the two pieces of tubing to each other, and applying that heat and pressure while the pieces are flattened. Such an approach is not usable in plastic pipe that has "shape memory" (such as larger diameter or thicker-walled, less pliable pipe) because, among other things, those "shape memory" pipes typically are much more rigid than the tubing of that '233 patent and cannot be flattened (because it would deform the pipe beyond its "shape memory" or yield point).

Other types of pipe are commonly joined by similarly relatively complex or expensive technologies. For example, PVC pipe is presently joined using a coupling that is adhered to the adjoining pipes. Currently, the most common method of joining polyethylene gas pipe is a method that end butts, melts, and forces the adjoining pipes together to form a "couple-less" joint. This method is clever and effective but requires sophisticated costly and cumbersome equipment on the job site.

OBJECTS AND ADVANTAGES OF THE INVENTION

It is, therefore, an object of the invention to provide apparatus and methods for joining pipes to each other, using the "shape memory" or "material memory" property of the pipe. Persons of ordinary skill in the art will understand that the invention can be practiced with a wide variety of pipe materials having a wide range of cross-sectional shapes, in which one or the other or both of a female end and a male end of pipes can be temporarily deformed to permit insertion of the male end into the female end. This provides a joint that is simple to manufacture and install, and can be more secure than prior art joints.

Persons of ordinary skill in the art will also understand that, although much of the description herein focuses on temporary deformation of a female end, alternative embodiments can include temporary deformation (compression) of the male end, or temporary deformation of both the male and female ends. Moreover, although certain embodiments discussed herein involve some delay between the initial deformation of the pipe end and the assembly of the male and female ends with each other, other embodiments may involve simply forcing the male and female ends into engagement without "prior" deformation of either end. In such applications, the "temporary deformation" discussed herein preferably occurs during the relatively brief process of assembling the pipe segments to each other.

Another object of my invention is the provision of apparatus and methods of the aforementioned character, in which a plurality of pieces of pipe includes a first piece of pipe fabricated with a cross-sectional sidewall pattern along its length that is similar in size and shape to the cross-sectional sidewall pattern of a second piece of pipe, the first piece having a first end that is temporarily deformed to function as a female end for receiving a non-deformed end of the second piece of pipe, the temporary deformation being both sufficiently large to permit the insertion of the non-deformed end of the second piece of pipe but also sufficiently small to ensure that the material memory of the first end returns the first end toward its original non-deformed configuration with sufficient compressive force to grip the second end and prevent its inadvertent removal from engagement with the first end. Engagement elements can be formed within the pipes' cross-sectional sidewall pattern to act between the first and the second pieces of pipe to increase the force necessary to disengage the pipe pieces from each other following assembly. Among the many alternative embodiments of the invention, the pipe sidewall pattern can include a corrugated exterior surface (with or without an internal non-corrugated liner element), can be non-corrugated with a generally constant radius along its length (a "mono-walled" pipe), or can be of other patterns.

A further object of my invention is the provision of apparatus and methods of the aforementioned character, in which the first piece of pipe includes a second end remote from the first end, the second end also being temporarily deformed to function as a female end for receiving a corresponding non-deformed end of a third piece of pipe, the third piece of pipe having a cross-sectional sidewall pattern along its length that is similar in size and shape to the cross-sectional sidewall pattern of the first and second pieces of pipe. One or more sealing elements can be positioned between confronting surfaces of the first and second pieces of pipe to help provide a watertight seal therebetween. Adhesive can be placed between confronting surfaces of the first and second pieces of pipe to bond the first and second pieces to each other upon insertion of the second piece into the female end of the first piece.

Yet another object of my invention is the provision of apparatus and methods of the aforementioned character, including providing a stretching tool for use in connection with the apparatus and methods. Among the many alternative embodiments, the tool can be a heating element to soften the end to be deformed, or can deform the end mechanically. In the latter approach, a channel can be provided in the tool, into which an edge of the first piece of pipe can be inserted in its originally fabricated shape, with the tool including means to temporarily stretch or deform the edge to the female end configuration capable of receiving the non-deformed end of the second pipe piece. The mechanical tool embodiments can include a plurality of rollers positionable along the inside and outside surfaces of the eventual female end of the first piece of pipe, and can further include means for exerting force to act between the rollers and the eventual female end to deform the female end from its originally fabricated shape.

A still further object of my invention is the provision of apparatus and methods of the aforementioned character, including a temporary stretch-holding device for use in connection with the apparatus and methods. Among the many alternative embodiments, the device can include a first portion for temporary insertion into the deformed female end of the first pipe piece. Preferably, the first portion is sized and configured to retain a sufficient degree of the deformation of the female end so that, upon the removal of the device from the female end, the non-deformed end of the second piece of pipe may be inserted into engagement with the female end. The device can also include a second portion to assist in desired removal of the device from its temporary insertion into the deformed female end.

Still another object of my invention is the provision of apparatus and methods of the aforementioned character, in which the temporary stretch-holding device is a generally annular ring element fabricated with a cross-sectional sidewall pattern that is similar in size and shape to the cross-sectional sidewall pattern of the first piece of pipe, and the second portion includes a radial cut to allow a degree of compression of the cross-sectional pattern to facilitate the desired insertion into and removal from the female end. Among the many alternative embodiments, the temporary stretch-holding device can likewise be fabricated with a cross-sectional sidewall pattern that is similar in size and shape to the cross-sectional sidewall pattern of the first piece of pipe, and the second portion includes an axially lengthwise cut to allow a degree of compression of the device to facilitate the desired insertion into and removal from the female end. In certain embodiments, the second portion can include a strap element or grippable portion, or both, upon which force can be exerted to effect the desired removal of the device from the deformed female end. In some embodiments, the temporary stretch-holding device can also be sized and configured to cover the pipe joint after the device is removed from its temporary engagement within the female end.

An additional object of my invention is the provision of apparatus and methods of the aforementioned character, including the steps of: (1) providing a plurality of pipe pieces fabricated with a substantially uniform cross-sectional sidewall pattern along their length; (2) stretching a first end of at least one of the pipe pieces sufficiently to permit the insertion of a non-stretched end of another piece of the pipe without stretching the first end so far as to destroy its material memory; (3) inserting the non-stretched end of the another piece of the pipe into the stretched first end; and (4) allowing the material memory of the stretched end to return the first end toward its original non-stretched configuration with sufficient compressive force to grip the non-stretched end of the another piece of the pipe and prevent its inadvertent removal from engagement with the stretched end.

By way of example and not by way of limitation, further method steps can include: (1) having the step of stretching a first end performed by a tool of the aforementioned character; and (2) inserting into the temporarily stretched first end a device for holding the stretch prior to the step of inserting the non-stretched end of the another piece of the pipe into the stretched first end, the device being sized and configured to retain a sufficient degree of the stretch of the first end so that, upon the removal of the device from the stretched end, the non-stretched end of the another piece of the pipe may be inserted into engagement with the stretched end; leaving the device in its temporary insertion position for a discrete period of time to facilitate transport, handling, or other processing of the pipe; and removing the device from the stretched end prior to insertion of the non-stretched end of the another pipe piece.

Another object of my invention is the provision of apparatus and methods of the aforementioned character, including providing a coupling system for coupling like-shaped and like-sized pipe segments to each other, including a female end of a first pipe segment temporarily deformed within its elastic limits to permit insertion of a male end of a second pipe segment, the female and male ends configured so that, following insertion of the male end into the female end, compressive forces are generated by the material memory of the female end to maintain desired engagement between the pipe segments.

Another object of my invention is the provision of apparatus and methods of the aforementioned character, including providing a pipe joint comprising: first and second pieces of pipe having a generally uniform cross-sectional pattern; a female end of the first piece of pipe formed by temporary expansion of the end via application of energy thereto, the expansion not exceeding the limits of the pipe material's ability to return substantially to its original cross-sectional shape and size; and a non-expanded end of the second piece of pipe insertable within the female end of the first piece of pipe while the female end is expanded.

Other objects and advantages of the invention will be apparent from the following specification and the accompanying drawings, which are for the purpose of illustration only.

BRIEF DESCRIPTION OF THE DRAWINGS

FIG. 1 is a side view of a corrugated pipe embodiment of the invention, including a central rubber/elastic gasket element, one of the many ways in which the invention can be practiced;

FIG. 2 is a sectional view taken along line 2-2 of FIG. 1;

FIG. 3 is similar to FIG. 2, but illustrates the two pieces of pipe assembled with each other, with the central rubber/elastic gasket element between them;

FIG. 4 is similar to FIG. 1, but illustrates one of the many alternative embodiments of the invention, in which a single piece of pipe has a temporary stretch-retaining element positioned in a female end;

FIG. 5 is a sectional view taken along line 5-5 of FIG. 4;

FIG. 6 is similar to FIG. 5, but illustrates removal of the temporary stretch-retaining element and preparation for assembly of a second piece of pipe to the first piece of pipe;

FIG. 7 is similar to FIG. 5, but also illustrates the other end of the first piece of pipe and a preferred application of force to accomplish the engagement of that first piece of pipe with a second piece of pipe at the right-hand side of the figure;

DESCRIPTION OF PREFERRED EMBODIMENT

Figure 8:
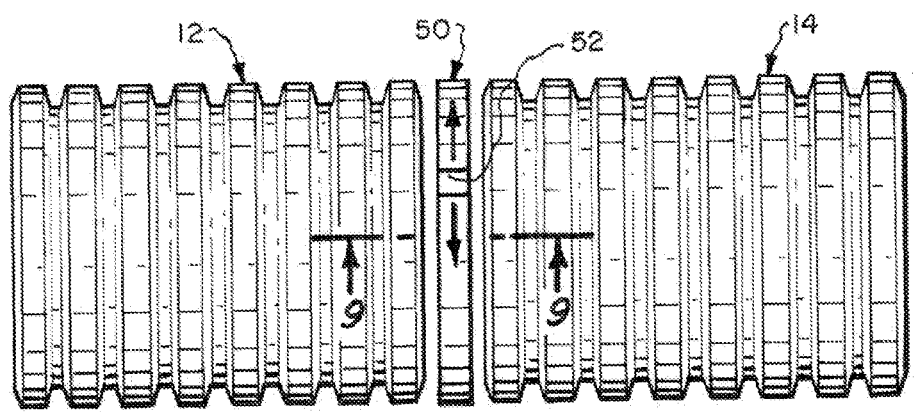
FIG. 8 illustrates another of the many alternative embodiments of the invention, in which the temporary stretch-retaining element is configured as an inverted U-shaped ring that has been cut across its lengthwise axis at one portion of the ring, to permit the ring to be slightly compressed or expanded in its diameter.
Figure 9:
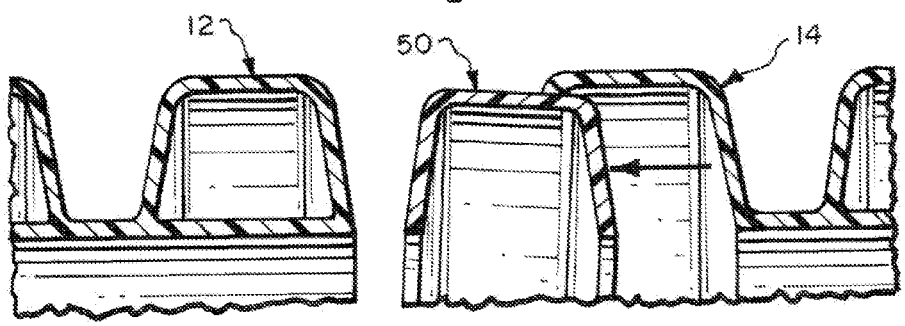
FIG. 9 is a sectional view taken along line 9-9 of FIG. 8.

Several preferred embodiments of the invention are illustrated generally in the attached drawings. In general terms, the invention utilizes the "shape memory" or the "material memory" elastic property of certain pipe sidewalls to form a joint with other similarly sized and shaped pipes. Persons of ordinary skill in the art will understand that the invention can be practiced with a broad range of materials (any which have a sufficient stretchability in relationship to the sidewall thickness and circumference of the pipe), and for a broad range of sidewall cross-sections.

In the embodiment of FIGS. 1-3, two pipe elements 12 and 14 have a generally corrugated cross-section, similar to the corrugated tubing B described in U.S. Pat. No. 5,326,138, which is incorporated herein by reference. The pipe elements 12 and 14 have interior "flat" liner portions 16 and 18 and exterior corrugated portions 20 and 22.

Preferably, a male end is provided on element 12, such as by forming or cutting the end of the pipe 12 at an interior shoulder 24. A female end is provided on element 14 by removing a portion 26 of the interior liner portion 16 or otherwise forming a recessed inner shoulder 30, and by providing an outer lip or engagement element 28, again by cutting, molding, or other suitable method. Persons of ordinary skill in the art will understand that, in the assembled joint, lip or engagement element 28 provides additional resistance to disengagement of the joint, beyond any frictional (such as may result from the hoop stress of the male and female ends with each other) or other engagement between the pipes 12 and 14.

Also preferably, the male end of element 12 and the female end of element 14 can be joined as illustrated in FIG. 3, typically by forcing the male end into the female end via application of axial pressure of the two elements toward each other. During that assembly, the lip 28 preferably rides up and over the male end to reach the overlapping position shown in FIG. 3.

If necessary or helpful, the female end of pipe 14 can be heated or otherwise "softened" or deformed to facilitate the insertion of the male end. In FIG. 2, for example, a heating element 34 is illustrated as applying heat to the female end to soften or increase the flexibility of the lip 28 and the remaining female end of pipe 14. Among the many other ways to provide necessary or desirable softening to the pipe end is via mechanical rolling or similar processing, such as discussed further below in connection with FIGS. 16-18.

Depending on several factors (such as the degree of heating or rolling, the ambient temperature, the material of which the pipe is fabricated, and other factors), the "softness" of the female end and the corresponding ease of insertion of the male end into it may be retained for a shorter or longer period of time. In certain applications, the pipe components may even be joined soon enough after manufacture that there is some residual flexibility/softness in the material because it has not yet hardened following manufacture.

Persons of ordinary skill in the art will understand, however, that the strength of the joint varies depending on that "hardening" or setting of the female end once it has been assembled as shown in FIG. 3. The "harder" the set, the more force the joint can withstand before the pipe segments come apart. This softening/stretching/hardening relates to the coefficient of elasticity of the pipe material, and the "firmness" of the finished joint can thus be designed by selecting from a variety of materials, sidewall thicknesses, molding process, and the like. Persons of ordinary skill in the art will understand that, in the "hardened" final assembled position, hoop stresses act on the male and female ends to help hold the joint together.

If necessary or desired, a flexible gasket element 32 (preferably formed of rubber or other suitable material) can be placed over the male end of pipe 12 prior to its assembly with the female end of pipe 14, to serve as a sealing element at the joint between those pipe 12 and 14. Such sealing elements can be of any suitable configuration and can be located at any suitable position within the joint, including by way of example the alternative embodiments illustrated in FIGS. 14 and 15, as further discussed below. As also discussed further below, adhesives and other elements can be used to help hold together the male and female ends in their desired assembled configuration.

Persons of ordinary skill in the art will understand that, among the many alternative embodiments of the invention, a single pipe segment such as pipe 14 can in fact have two female ends or two male ends, so that a corresponding pipe end having the opposite gender can be joined thereto. Moreover, persons of ordinary skill in the art will understand that a plurality of similarly sized and shaped pipe elements can be provided to permit assembly of a multiplicity of such elements together into a pipeline of any selected length. For many pipe materials, the invention permits easy field adaptations for length, in that a male end can be "made" on site simply by cutting a pipe element at the nearest shoulder (such as shoulder 24, FIG. 2) to the desired length.

FIGS. 4-6 illustrate, among other things, a tool and method helpful in connection with the corrugated pipe embodiment of FIGS. 1-3. As best shown in FIGS. 5 and 6, a temporary stretch-holding device 40 is preferably fabricated from the same material as the pipe element 14. Device 40 can take any suitable form, and is intended to be inserted into the female end of pipe 14 for various purposes prior to assembly of pipes 12 and 14, and then removed to permit that assembly. To facilitate that removal, a strap 42 can be provided, on which a user can pull to pop out the device 40. Alternatively or additionally, an extension 43 can be provided on the device 40 to permit gripping, and to otherwise facilitate handling, storage, or other aspects of use of the device.

Persons of ordinary skill in the art will understand that the preferred shape and size of the device 40 is such as to maintain a desired "spread" or expansion of the female end of pipe 14 during the time in which the device 40 is assembled in that female end. For convenience, and depending on the pipe materials and other consideration, devices 40 can even be fabricated from portions of the pipe elements such as elements 12 and 14, by cutting those pipes into appropriate lengths. Persons of ordinary skill in the art will understand that, although the insert device 40 is shown as being relatively short (only one corrugation hump is shown), other embodiments may include multiple humps or other lengths, or substantially different cross-sections. Similarly, and again, depending on the pipe material and the application, workers can actually fabricate the joint of the invention "on site" by cutting or forming generic pipe elements to provide the male and female pipe ends, as discussed herein.

Depending on the application, it may be useful or necessary to "soften" the female end at an first geographic location such as at a manufacturing or processing plant, immediately insert the device 40 to stretch or maintain the stretch of the female end into a desired position (to be more receptive to the eventual insertion of the corresponding male end), and then store the pipe until such time as it is to be installed at a worksite.

The device 40 can remain in its operative engagement with the female end of pipe 14 during transportation to a second geographic location such as a sewer trench. In addition to its "spreading" function, the device 40 can serve as a contact surface for pushing the pipe element 14 to assemble its opposing end into a corresponding pipe via a joint such as that shown in the drawings. FIG. 7 illustrates such an assembly apparatus and process, in which force (such as by a forklift or other big machinery, as may be necessary or convenient for large diameter pipes or for certain applications) can be applied at the arrow A to help force male end B into engagement with female end C.

As mentioned above, adhesive 44 such as a suitable glue or bonding agent can be applied (see the applicator illustrated at the left side of FIG. 6) to the joint as some or all contacting surfaces, to increase the strength and/or the watertightness of the joint.

As indicated above, a plurality of such pipes 14 with devices 40 therein can be provided and used in like manner, such as to transport a large quantity of such pipes to a jobsite for assembly to each other to form a long pipeline. The pipes can be of uniform length, or can be of varying length, and still provide various benefits of the invention.

The device 40 is preferably reusable, so as to be environmentally friendly. In addition, depending on the pipe materials and the application, a gap such as circumferential gap 46 can be provided (such as by cutting or forming) in the outer corrugated structure of the device. Persons of ordinary skill in the art will understand that such a gap allows that outer corrugated inverted U-shaped structure to "compress" slightly and thereby facilitate insertion of the device 40 into a female end of pipe 14. In addition, those persons will understand that, although the gap 46 is shown in FIGS. 5-7 as being located on the right-hand side of the device 40, it may alternatively be provided in a wide range of locations, including at virtually any position along the U-shape, such as on either downward arm, on the flat center portion, or otherwise.

One of the many alternative embodiments of that insert device 40 is shown in FIGS. 8-11, as expandable/compressible ring 50. In this embodiment, a ring 50 is formed or cut in a substantially inverted U-shape, without the inner liner portion of the corrugated pipe. If desired, it can even be cut from actual pipe elements such as pipes 12 or 14. Ring 50 preferably is cut at one point along its lengthwise axis, such as at 52, which preferably enables it to be readily compressed into at least a slightly smaller diameter than its original uncut shape, but also permits it to be "spread" into a larger diameter, as further discussed below.

Figure 10:
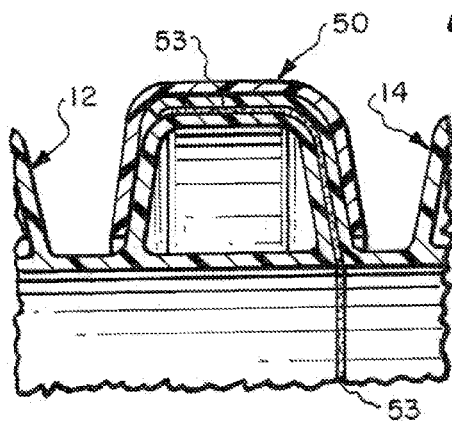
FIG. 10 is a sectional view taken along line 10-10 of FIG. 11, showing a preferred assembly of the various elements of FIGS. 8 and 9.
Figure 11:
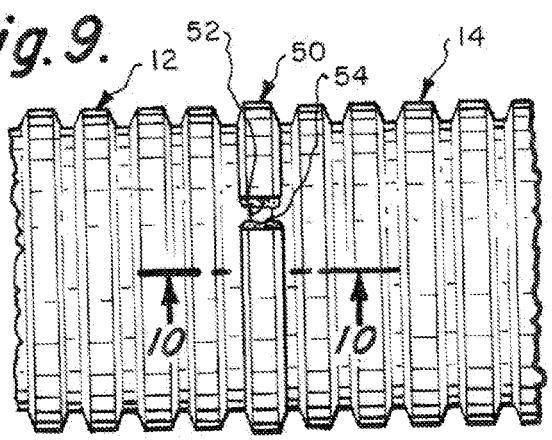
FIG. 11 is similar to FIG. 8, but illustrates a preferred assembly of the various elements from that FIG. 8.

The expandable/compressible ring 50 can serve many of the same functions as the insert device 40, but in addition can serve as an outer protective shell for the pipe joint. As best illustrated in FIGS. 10 and 11, and among the benefits of being able to "spread" the ring 50 into a larger diameter, the ring can be assembled over the joint to shield the joint from damage, weather, or the like. If necessary or desired, glue or other adhesive 54 can be placed at one or both ends 52 of the ring 50 (see FIG. 11, illustrating glue 54 at both ends), or at other or all contact surfaces between the interior of the ring 50 and the pipe joint covered thereby.

On a somewhat related point, persons of ordinary skill in the art will understand that, in FIG. 10, glue 53 is shown acting between the male and female pipe ends (similar to glue 44 in FIGS. 6 and 7), but that no such glue or adhesive may be necessary in certain applications.

The expandable/compressible ring 50 can also include a strap element or grippable extension (not shown, but similar to strap element 42 and grippable extension 43 of FIGS. 5-7) to facilitate removal of the ring 50 from its temporary engagement inside the female pipe end. In addition, depending again on the material from which ring 50 is fabricated, it may be helpful or necessary to include spacer blocks (not shown, but made of Styrofoam or other suitably strong, light weight material) inside the U-shaped area of the ring 50 to help it maintain its desired cross-sectional configuration (rather than collapsing or otherwise failing).

Figure 12:
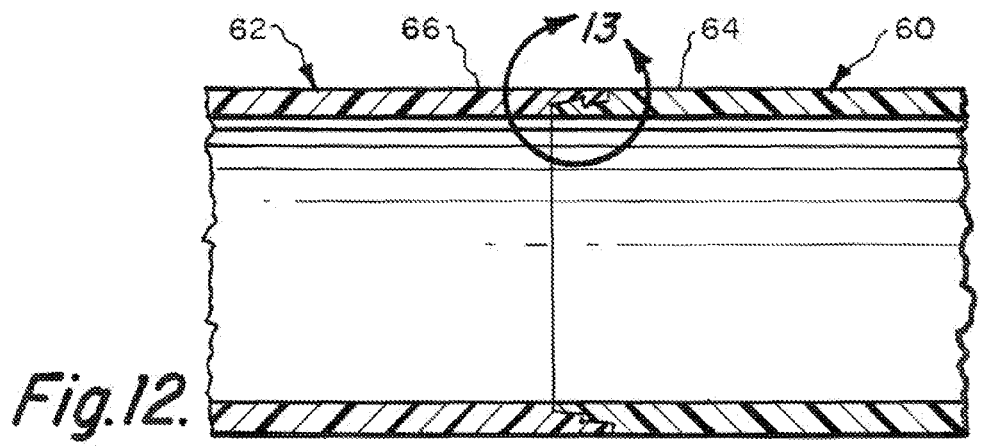
FIG. 12 illustrates yet another of the many alternative embodiments of the invention, in which the pipe sidewall is a "mono" layer.
Figure 13:
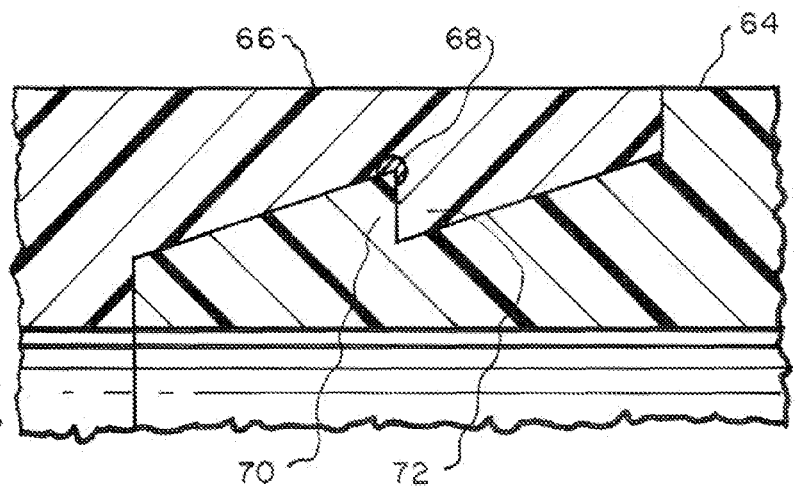
FIG. 13 is a sectional view taken along line 13 of FIG. 12.

FIGS. 12 and 13 illustrate yet another of the many alternative embodiments of the invention. Straight-walled pipe elements 60 and 62 preferably have similarly sized and shaped cross-sections, and can be fabricated or modified to include corresponding male and female ends 64 and 66 that utilize the "shape memory" or "material memory" of the invention to form a pipe joint. Where necessary or desired, a sealing element such as an O-ring 68 can be provided as some location along the contact areas between the ends 64 and 66.

Much of the foregoing discussion concerning corrugated pipe applies with equal force to the straight-walled embodiment of FIGS. 12 and 13. Among other things, the joint of FIGS. 12 and 13 uses the stretching or expansion of the female end 66 and its material memory property that forces it back into engagement with the male end 64.

Persons of ordinary skill in the art will understand that the precise shape of the ends 64 and 66 can be any of a wide variety. Preferably, the ends include some type of engagement elements 70 and 72 such as annular detents or other structures to provide additional resistance to disengagement of the joint. As discussed above, the interaction of engagement elements 70 and 72 may be beyond or in addition to any frictional engagement between the ends 64 and 66 that may result from the hoop stress of the male and female ends with each other, adhesives, or other engagement between the ends 64 and 66.

Figures 14, 15:
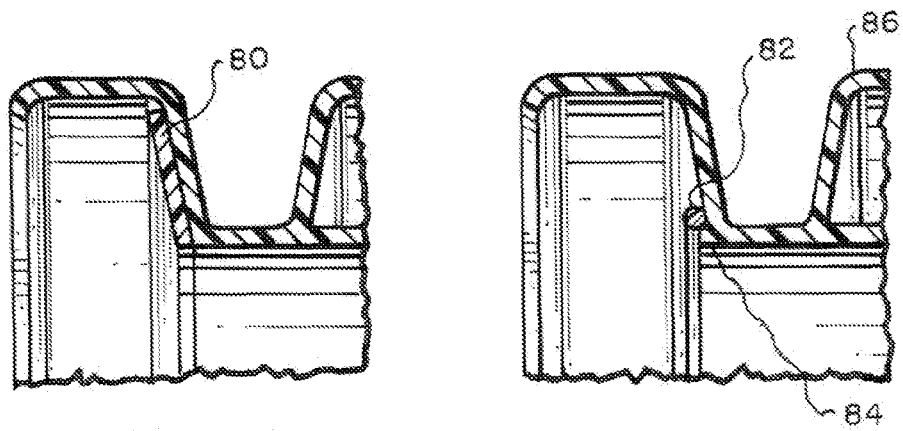
FIG. 14 is similar to FIG. 3, but shows only the female pipe end and illustrates an alternative gasket element.
FIG. 15 is similar to FIG. 14, but illustrates one of the many ways in which an O-ring sealing element may be used with the invention.

FIGS. 14 and 15 illustrate some of the many alternative embodiments of sealing elements useful in connection with the invention, such as gasket 80 (FIG. 14) and O-ring 82 (FIG. 15). FIG. 15 also illustrates the possible inclusion of a slight extension 84 of the inner sleeve of the corrugated pipe segment 86 (which element 86 is otherwise similar to pipe element 14 discussed above).

Figure 16:
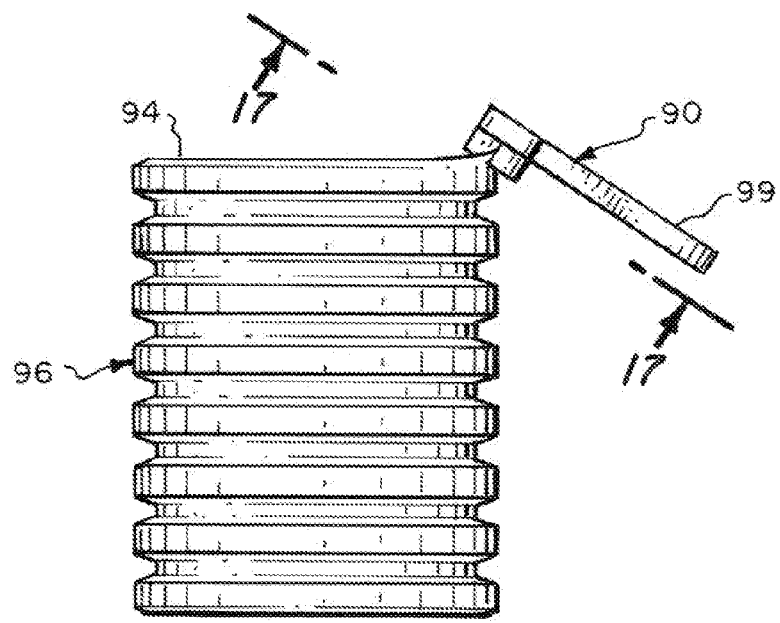
Figure 17:
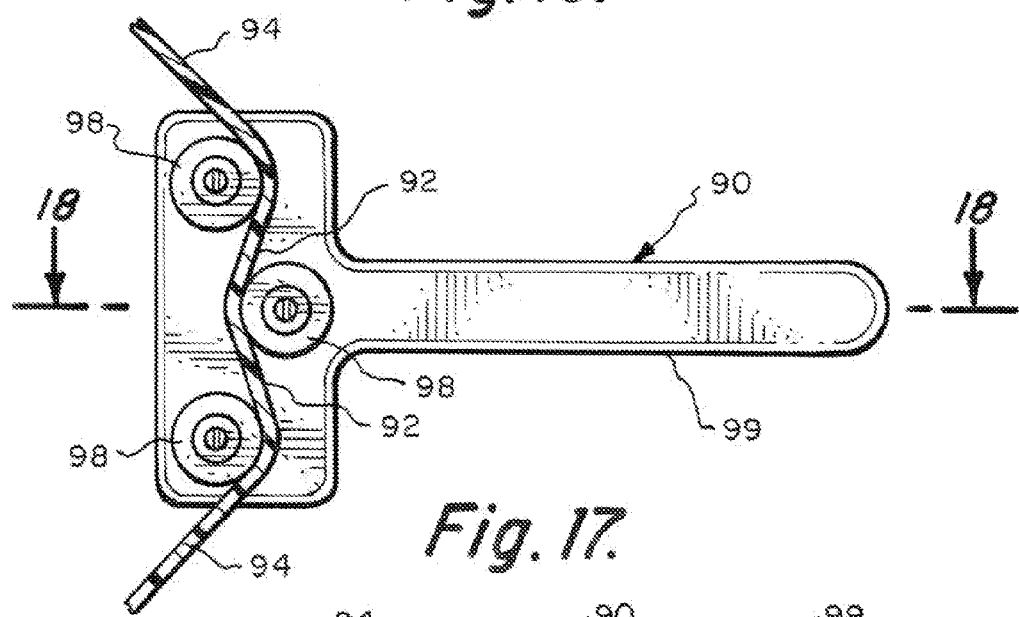
Figure 18:
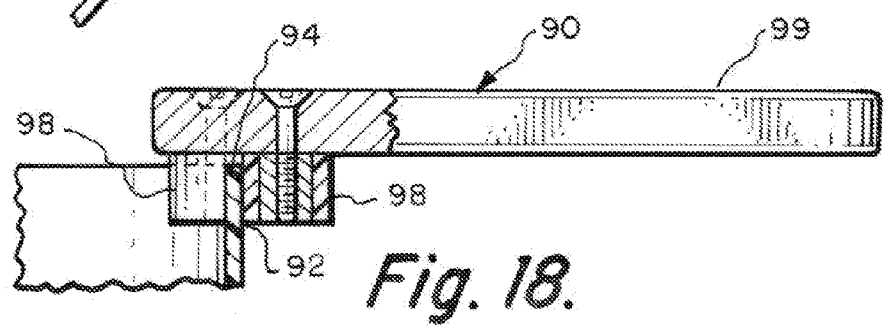

Finally, FIGS. 16-18 illustrate a stretching tool 90 for use in connection with the apparatus of claim 1, including a channel or path 92 into which an edge 94 of the first piece of pipe 96 can be inserted in its originally fabricated shape. Preferably, the tool 90 includes means to temporarily deform the edge 94 into the female end configuration discussed above, so that the end 94 is then capable of receiving a non-deformed male end of a second pipe piece, a "stretch-holding" element such as element 40 or 50 discussed above, or the like. The means to temporarily deform the edge 94 can include a wide variety of elements, including without limitation a plurality of rollers 98 mounted on a handle 99. Persons of ordinary skill in the art will understand that the rollers 99 are positionable along the inside and outside surfaces of the eventual female end of the first piece of pipe, and a means for exerting force to deform the eventual female end is provided by any suitable means, including without limitation by applying leverage/torque to the handle 99 to "bend" the edge 94 as shown in FIG. 16.

Among other things (and not shown in the attached drawings), the stretching tool 90 can be embodied by an automated device, in which both the tool 90 and the tubing 96 would be moved by machines with respect to each other, or by a mandrel that is forced into the female end 94 to spread it from its originally fabricated shape.

Certain embodiments of the present invention relate to a process joining together structurally corrugated polyethylene pipe taking advantage of the polyethylene's shape memory and the exterior corrugated structure and construction process of the a joining pipes allowing significant surface contact area of the outside, outside the end-butted inner liners, that is, which permits a superior pressure resistance to leaks due to the large flanged multiaxial area which is joined together. The memory of the polyethylene allows smaller diameter pipe to be forced over a larger diameter pipe receiver, or male end if you will, and when proportioned accordingly the smaller diameter locks onto the larger diameter where a circumferential force exists due to the memory of the smaller diameter surface area forcing itself against the surface of the larger diameter drainpipe establishing a clamping effect. This clamp like condition is ideal for sealant/adhesive application and when said sealant-applied prior to joining the two pipes together forms a union of high-pressure resistance. This circumferential compression force is also useful should sonic welding or other applied heat methods such as heat filament circumferentially wound be desired.

Among the ways that the present invention differs from the prior art is that it teaches the weaving together of a corrugated plastic pipes in such a manner that a portion of one of the two pipes to be joined has a natural state of a smaller diameter than the natural state of diameter to which it passes over and is joined. This creates a compression force which holds the joined pipes together. For embodiments having inner liners on the pipe wall, the invention can permit those inner liners to butt against one-another forming an essentially uninterrupted flow path of comparatively high pressure resistance. This compression force due to the memory induces an ideal condition for forming a seal using sealant/adhesive, O-rings, gaskets or heat.

As explained herein, the present system preferably utilizes the "shape memory" of the pipe so that a female end of a first piece of pipe is stretched or otherwise pops over a mating male end of a second piece (viewed another way, the male end "snaps into" the female end). The shape memory of the end portions cause the female end to pull tightly around the male member and the pipes' hoop strength to hold the two pieces in engagement.

Preferably, and as explained above, the shape and size of the pipe pieces are the same, and the deformation of the female and/or male portions (such as possible slight compression of the male member) during assembly is within the elastic, recoverable range of the pipe material. Also preferably, the joint between the pieces includes at least one interfering structure, such as interfitting/seating ribs or an annular barb on the male portion that seats in a corresponding groove inside the female portion (see FIGS. 12 and 13).

Among the many applications of this invention is polyethylene gas pipe joints and/or poly-vinyl-chloride pipe. The invention could also be applied to pipes that have less shape memory properties, such as copper pipe or other metal piping.

The present invention eliminates the need for a separate coupling element, the joining mechanism instead being incorporated into the fashioned pipe ends, which can be done at the factory or tooled on the job site. Using the present invention, a two-part adhesive can be applied to the fashioned adjoining pipe ends and the pipes can be forced together with little, if any, special job-site equipment to maintain and operate.

Among other benefits of the invention, the preferred embodiment of FIG. 1 allows manufacturers to make any length pipe with integrated watertight connections, without any stoppage of the extrusion-line, since the ends can be machined/milled to the configuration of FIG. 1 at any rung and no mold change is required.

The apparatus and methods of my invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

The invention claimed is:

1. A method of assembling a plurality of pipe pieces together, including the steps of:
   providing a plurality of pipe pieces fabricated with a substantially uniform cross-sectional sidewall pattern along their length;
   stretching a first end of at least one of said pieces sufficiently to permit the insertion of a non-stretched end of another piece of said pipe without stretching said first end so far as to destroy its material memory;
   inserting said non-stretched end of said another piece of said pipe into said stretched first end;
   allowing said material memory of said stretched end to return said first end toward its original non-stretched configuration with sufficient compressive force to grip said non-stretched end of said another piece of said pipe and prevent its inadvertent removal from engagement with said stretched end;
   inserting into said temporarily stretched first end a device for holding said stretch prior to said step of inserting said non-stretched end of said another piece of said pipe into said stretched first end, said device being sized and configured to retain a sufficient degree of said stretch of said first end so that, upon said removal of said device from said stretched end, said non-stretched end of said another piece of said pipe may be inserted into engagement with said stretched end;
   leaving said device in its temporary insertion position for a discrete period of time to facilitate transport, handling, or other processing of said pipe; and
   removing said device from said stretched end prior to said step of inserting said non-stretched end of said another pipe piece.

2. The method of claim 1, in which said step of stretching a first end is performed by a tool having a channel into which an edge of said first end can be inserted in its originally fabricated shape, said tool including means to temporarily stretch said edge to a configuration capable of receiving said non-stretched end of said another piece of said pipe.

3. The method of claim 1, including the steps of:
   stretching a second end of said at least one of said pipe pieces sufficiently to permit the insertion of a non-stretched end of a third piece of said pipe without stretching said second end so far as to destroy its material memory;
   inserting said non-stretched end of said third piece of said pipe into said stretched second end; and
   allowing said material memory of said stretched second end to return said second end toward its original non-stretched configuration with sufficient compressive force to grip said non-stretched end of said third piece of said pipe and prevent the inadvertent removal of said non-stretched end of said third piece of said pipe the from engagement with said stretched second end.

4. The method of claim 1, in which said plurality of pipe pieces have integral unbroken circumferential integrity.

5. A method of assembling a plurality of pipe pieces together, including the steps of:
   providing a plurality of pipe pieces fabricated with a substantially uniform cross-sectional sidewall pattern along their length;
   circumferentially expanding a first end of at least one of said pipe pieces sufficiently to permit the insertion of a non-stretched end of another piece of said pipe without expanding said first end so far as to destroy its material memory, said first end having substantially unbroken structural circumferential intactness to provide compressive hoop stress in response to that expansion;
   inserting said non-stretched end of said another piece of said pipe into said expanded first end;
   allowing said material memory of said expanded end to return said first end toward its original non-expanded configuration with sufficient compressive hoop force to grip said non-expanded end of said another piece of said pipe and prevent its inadvertent removal from engagement with said expanded end;
   inserting into said expanded first end a device for holding said expansion prior to said step of inserting said non-expanded end of said another piece of said pipe into said expanded first end, said device being sized and configured to retain a sufficient degree of said expansion of said first end so that, upon said removal of said device from said expanded end, said non-expanded end of said another piece of said pipe may be inserted into engagement with said expanded end;
   leaving said device in its temporary insertion position for a discrete period of time to facilitate transport, handling, or other processsing of said pipe; and
   removing said device from said expanded end prior to said step of inserting said non-expanded end of said another pipe piece.

* * * * *